United States Patent [19]

Sydansk et al.

[11] 4,284,140

[45] Aug. 18, 1981

[54] USE OF POTASSIUM HYDROXIDE SOLUTIONS IN A WELL BORE

[75] Inventors: Robert D. Sydansk, Littleton, Colo.; Frank S. Cordiner, Anchorage, Ak.

[73] Assignee: Marathon Oil Co., Findlay, Ohio

[21] Appl. No.: 164,620

[22] Filed: Jun. 30, 1980

[51] Int. Cl.³ ............... E21B 33/16; E21B 43/22; E21B 37/00

[52] U.S. Cl. ............... 166/291; 166/305 R; 166/312

[58] Field of Search ............... 166/252, 273, 274, 275, 166/277, 291, 292, 293, 301, 305 R, 307, 312; 405/263

[56] References Cited

U.S. PATENT DOCUMENTS

| | | | |
|---|---|---|---|
| 1,635,500 | 7/1927 | Potts | 166/292 X |
| 2,607,428 | 8/1952 | Bond et al. | 166/292 |
| 2,699,213 | 1/1955 | Cardwell et al. | 166/292 X |
| 3,103,973 | 9/1963 | Mullen | 166/292 X |
| 3,306,355 | 2/1967 | Maly | 166/292 |
| 3,372,748 | 3/1968 | Cook | 166/273 X |
| 3,603,399 | 9/1971 | Reed | 166/305 R |
| 3,625,286 | 12/1971 | Parker | 166/291 |
| 3,640,343 | 2/1972 | Darley | 166/292 |
| 3,777,817 | 12/1973 | Feuerbacher et al. | 166/274 |
| 4,031,959 | 6/1977 | Henderson | 166/307 |

FOREIGN PATENT DOCUMENTS 562639  8/1977  U.S.S.R. ............... 166/307

OTHER PUBLICATIONS

Cooke, Jr. et al., "Oil Recovery by Alkaline Waterflooding", *Journal of Petroleum Technology*, Dec. 1974, pp. 1365–1374.

*Primary Examiner*—Stephen J. Novosad
*Assistant Examiner*—George A. Suchfield
*Attorney, Agent, or Firm*—Jack L. Hummel

[57] ABSTRACT

A workover fluid, a kill fluid, or completion fluid having potassium hydroxide dissolved therein is injected into a well bore penetrating and communicating with a subterranean sandstone formation containing water-sensitive fine particles, including clays, and invades the sandstone formation. Potassium hydroxide contacts and stabilizes the fine particles for a substantial period of time thereby substantially preventing formation permeability damage caused by encroachment of aqueous solutions having a distinct and undesired ionic constituency.

40 Claims, No Drawings

USE OF POTASSIUM HYDROXIDE SOLUTIONS IN A WELL BORE

DESCRIPTION

TECHNICAL FIELD

The invention relates to a process for working over, killing, or completing a well bore penetrating and communicating with a water-sensitive, subterranean sandstone formation wherein clays present in the formation are contacted and stabilized and more particularly, to a process for working over, killing or completing a well bore penetrating a water-sensitive, subterranean hydrocarbon-bearing sandstone formation wherein clays present in the environment near the well bore that are contacted are stabilized for a substantial period of time.

BACKGROUND ART

Encroachment of aqueous solutions distinct in ionic character from connate water into subterranean sandstone formations containing clays often results in reduced fluid flow, and therefore, reduced oil production. Encroachment of aqueous solutions having a distinct ionic makeup in a subterranean sandstone formation can occur in a variety of ways, such as, invasion by an underlying aquifer, invasion of a secondary or tertiary oil recovery flood, and invasion of certain fluids utilized in the well bore or in the near well bore environment. In particular, fluids positioned within a well bore during workover operations, or fluids utilized to kill a well prior to a subsequent operation, or fluids utilized to complete a well bore for subsequent production or injection of fluids, tend to inadvertently invade the near well bore environment of a subterranean sandstone formation and may result in formation permeability damage and reduced fluid flow.

Two distinct types of clay damage can result from encroachment of aqueous solutions having a distinct ionic makeup. First, swellable clays, such as montmorillonite, have interstitial layers. Fresh water contact affects the ionic properties between these interstitial layers and swells these clays thereby impeding fluid flow therethrough. Secondly, migratable clays, such as poorly cemented kaolinite and illite clay particles, become detached from the subterranean sandstone formation during flow of fresh water therethrough. The resultant mobile clay particles can become trapped in the formation porethroat openings, and thus, reduce permeability and fluid flow therethrough. The second type of permeability reduction is referred to as clay particle migration. Often, encroachment of an aqueous solution having a distinct ionic makeup, for example, fresh water, into a subterranean sandstone formation containing clays results in the occurrence of both types of permeability damage.

Several prior art processes have been proposed to stabilize clays present in subterranean formations, and therefore, alleviate fresh water damage thereto. U.S. Pat. No. 3,640,343 to Darley discloses a method for stabilizing hard shaly earth formations (i.e., migratable clays) during drilling or fluid production by injecting into the hard shaly earth formation a dilute aqueous solution of alkali metal silicate containing $SiO_2$ in an amount from about 2 to about 6 percent by weight and having a viscosity of less than 2 centipoise and a pH of from about 11 to about 12. It has been proposed to inject an aqueous solution of potassium chloride or a soluble polyvalent cation salt solution, such as, calcium or magnesium salt solution, into a subterranean sandstone formation to stabilize clays. However, potassium chloride and polyvalent cation salt solutions will stabilize clays only when the connate brine in contact with the clay has a high potassium-to-sodium ion ratio or a relatively low polyvalent cation concentration. Clay stabilization resulting from treatment with potassium chloride solutions has proven only temporary in that most formation and injection waters have high sodium-to-potassium ion ratios, and as such, potassium ions are rapidly exchanged from the clays resulting in the loss of any clay stabilization attributable to the potassium ions. Clay stabilization resulting from ordinary polyvalent cations, such as, calcium and magnesium, affords only temporary protection against fresh water because such polyvalent cations are rapidly exchanged from the clays. Other proposed clay stabilization treatment fluids include a solution containing water-soluble organic polymers, a hydroxyaluminum, acidic solution, such as set forth in U.S. Pat. No. 3,603,399 to Reed, a calcium hydroxide solution, such as set forth in U.S. Pat. No. 4,031,959 to Henderson, a fluroboric aqueous acidic solution, and a soluble zirconium salt solution. Utilizing sodium hydroxide to stabilize clays has proven relatively ineffective in that sodium hydroxide can promote significant formation permeability damage, and in some instances, actually increases the fresh water sensitivity of formation clays.

Sodium hydroxide is often employed in well bore completion fluids for conditioning a well bore for cementing. Such completion fluids tend to inadvertently invade the near well bore environment of a water-sensitive, subterranean sandstone formation. Sodium hydroxide does not impede permeability damage due to such encroachment, but often actually reacts with certain silicate minerals present in formation to form plugging precipitates and gels which further reduce permeability.

The above treatment solutions, most of which do not contain hydroxide ions, have resulted in varying effectiveness, are relatively expensive to utilize or result in adverse in situ side effects, such as permeability reduction. Thus, a need exists for processes for working over, killing and completing a well bore penetrating a subterranean sandstone formation which do not result in substantial fresh water permeability damage to a subterranean formation containing clays and which stabilize such clays for a substantial period of time.

DISCLOSURE OF INVENTION

The present invention relates to workover fluids, kill fluids, or completion fluids which, in addition to being a suitable workover, kill fluid, or well completion fluid, and being a non-damaging fluid to contacted water-sensitive sandstone formations, stabilize water-sensitive fine particles, including clays, present in a subterranean sandstone formation for a substantial period of time. A workover fluid, kill fluid, or completion fluid having potassium hydroxide dissolved therein is injected into a well bore penetrating the sandstone formation and invades the formation. Invasion of such fluids may be inadvertent (presumably a limited amount) or may be designed to penetrate a given distance away from the well bore. Designed penetration of the formation would be to specifically treat the water-sensitive clays in that volume of the formation in order to stabilize such clays. Inadvertent invasion will always occur, to a degree, if such fluids fill a well bore that is in communication with the subterranean formation. The potassium hydroxide stabilizes the fine particles for a substantial period of time thereby effectively reducing formation permeability damage caused by encroachment into the treated or contacted formation of aqueous solutions having an ionic makeup distinct from that of connate water. Potassium hydroxide concentration and/or the period of time over which potassium hydroxide is maintained in the well bore can be increased at relatively low formation temperatures to ensure effectiveness of clay stabilization.

BEST MODE FOR CARRYING OUT THE INVENTION

The present invention relates to processes for working over, killing or completing a well bore wherein clays present in a water-sensitive, subterranean sandstone formation are contacted and stabilized for a substantial period of time. As utilized throughout this description, the term "clay stabilization" refers to treating a sandstone formation in such a manner as to substantially prevent permeability damage and fluid flow reduction caused by any variation in salt (ionic) makeup of injection and produced waters. Reduced fluid flow results from negative interaction between an aqueous solution having a distinct ionic makeup, for example, fresh water, and fine particles, including clays. Fine particles which are involved in fresh water permeability damage include all swelling and potentially mobile fine particles present within the sandstone pore bodies. Fine particles are those particles which have diameters less than 37 micrometers. Examples of fine particles which can contribute to permeability damage are clays, high surface area silica minerals, mica, feldspars, and barite. As utilized throughout this description, the term "clays" encompasses both swelling clays, such as, montmorillonite, vermiculite, swelling chlorite, mixed layered swelling clays, and migratable clays, such as, poorly cemented kaolinite and illite clay particles. "Mixed layered swelling clays" is inclusive of layered mixtures of swelling and non-swelling clays which will swell when contacted with fresh water. The term "fresh water" refers to an aqueous solution which has a relatively low concentration of dissolved salts, including monovalent ions.

The present invention comprises incorporating potassium hydroxide into a fluid utilized to workover a well bore, into a fluid utilized to kill a well bore, or into a fluid utilized to complete a well bore for subsequent production or injection of fluids, for example, a wellbore conditioning fluid for subsequent cementing operations. As utilized herein, a "workover fluid" is any fluid which is positioned within a well bore while any workover operation is being performed. A "workover operation" is any maintenance performed on the well bore or on any equipment positioned within the well bore. A "kill fluid" is a fluid which possesses a density sufficient to create a hydrostatic pressure when placed within the well bore which is greater than the formation pressure so as to prevent encroachment of formation fluids into the well bore during a subsequent operation on the well, formation, or well equipment. A "completion fluid" is any fluid utilized to prepare a well bore just drilled for subsequent production or injection of fluids. For example, a completion fluid can be employed to clean the face of a well bore prior to a cementing operation by removing, for example, drilling muds, clays, and debris remaining from drilling operations, or by substantially negating the deleterious effects thereof.

As normally employed, workover, kill and completion fluids tend to inadvertently invade the subterranean sandstone formation which the well bore penetrates, especially the near well bore environment, and thus, can result in formation permeability damage and reduced fluid flow due to inducing clay permeability damage. As utilized throughout this description, the term "near well bore" denotes the area of a subterranean sandstone formation surrounding a well bore penetrating same which usually extends a radial distance of up to about 3 meters from the well bore and may extend up to about 9 meters or more. As the greatest fluid pressure drop, fluid velocity and quantity of fluid transported occurs in the near well bore environment of a subterranean formation, the near well bore environment is the area of a subterranean formation most susceptible to clay damage. In addition, permeability damage in the near well bore environment has the greatest effect on fluid injection or production. Potassium hydroxide which is incorporated into a workover fluid, kill fluid, or completion fluid in accordance with the present invention substantially prevents fluid induced permeability damage and stabilizes clays present in the portion of a subterranean sandstone formation which is contacted thereby, and thus, substantially prevents fresh water permeability damage and reduced oil reduction. It has been discovered that the hydroxide ion interaction with formation clays in the presence of potassium ions unexpectedly results in clay stabilization for a substantial period of time. While it is not completely understood exactly why such stabilization results, it is believed that the hydroxide ion-sandstone interaction in the presence of potassium ions retains the beneficial potassium ion stabilization affect on clays over a substantial period of time by one of the following two mechanisms, both of which involve clay dissolution to some degree. First, a fine, potassium-aluminosilicate mineral (possibly a potassium zeolite) is precipitated over the clays in the subterranean sandstone formation. This potassium-aluminosilicate precipitate prevents fresh water from contacting the clays and also cements migratable clay particles to pore walls of the formation. Secondly, the irreversible hydroxide ion sandstone interaction partially dissolves formation clays resulting in the breaking of silicon-oxygen bonds which subsequently reform in a more stable manner. The stable rearrangement results in migratable clay particles being chemically bonded to the sandstone formation pore walls and the interstitial layers of swelling clays, being chemically bonded together.

Potassium hydroxide utilized in accordance with the present invention will stabilize contacted clays over to a wide range of subterranean sandstone formation mineralogies. The process of the present invention can be applied to subterranean sandstone formations having a temperature of about 22° C. up to about 85° C. and above. Workover, kill, or completion fluids having potassium hydroxide incorporated therein in accordance with the present invention can be designed to be injected into the well bore at a finite solution flow rate as static treatment may result in minor formation permeability damage. Such finite solution flow rate causes the workover, kill, or completion fluid to invade the near well bore environment of a subterranean sandstone formation so as to prevent permeability damage thereto and stabilize clays therein. However, a static treatment (i.e. no flow) can be utilized in accordance with the present invention to achieve beneficial results, especially clay stabilization, caused by an inadvertent invasion of the near well bore environment.

As the effectiveness of potassium hydroxide utilized in accordance with the present invention is at least partially controlled by the kinetics of the hydroxide ionsandstone interaction, the effectiveness thereof in stabilizing clays is dependent on several kinetic parameters. Such effectiveness is dependent upon potassium hydroxide concentration. The concentration of potassium hydroxide utilized in workover, kill, and well completion fluids can range from about 1 wt.% up to the solubility of potassium hydroxide in solution. The concentration of potassium hydroxide utilized preferably is about 15 wt.% to about 25 wt.%. Clay stabilization effectiveness is also dependent upon the treatment time employed. Treatment time can range from a lower limit which is dictated by the kinetics of the hydroxide ion-sandstone interaction to an upper limit which is dictated by the economics involved in unrealized hydrocarbon production due to shutting in a well bore during treatment. Treatment time is preferably from about 1 hour to about 48 hours, and more preferably, is about 24 hours. The sandstone formation temperature has a bearing on clay stabilization effectiveness, and in part, dictates the potassium hydroxide solution concentration and/or the treatment time. Thus, although potassium hydroxide utilized in accordance with the present invention can stabilize clays for a substantial period of time over a wide range of formation temperatures, at relatively low formation temperatures, for example, from about 22° C. to about 45° C., potassium hydroxide concentration or treatment time must be increased to maintain the effectiveness of clay stabilization which occurs at high formation temperatures. At such low formation temperatures, potassium hydroxide concentration is the preferred parameter to increase. In general, a variance in formation temperature will vary the preferred potassium hydroxide concentration and treatment time.

The following examples are illustrative of the application of potassium hydroxide in accordance with the present invention to stabilize clays in a water-sensitive, subterranean sandstone formation and are not to be construed as limiting the scope thereof. Three distinct indicia are utilized throughout the following examples to evaluate the effectiveness of clay stabilization treatments. All three indicia utilize the ratio $k_{final}/k_{initial}$ ($k_f/k_i$) which is the ratio of the final fluid permeability measured after application of a given operation to the initial fluid permeability measured prior to application of any operation. The first indicia is the ratio $(k_f/k_i)_t$ which is the ratio of fluid permeability of a subterranean sandstone formation core measured after application of a given treatment to the fluid permeability of the core measured prior to treatment application. This ratio indicates the permeability damage which is attributable to the treatment. Such damage may result from, for example, in situ precipitation of constituents of a treatment fluid. An ideal treatment should result in $(k_f/k_i)_t$ equalling 1.0. The second indicia is the ratio $(k_f/k_i)_{cs}$ which is the ratio of fluid permeability of a subterranean sandstone formation core measured after application of a given clay stabilization treatment, and after subsequent 3.0 wt.% NaCl and fresh water floods to the fluid permeability of the core measured prior to the application of any operation. The fresh water floods utilized in the examples consist of distilled water floods and, unless noted to the contrary, consist of ten pore volumes of distilled water flooded at a frontal advance rate of approximately 30 m/day. The ratio $(k_f/k_i)_{cs}$ indicates the susceptibility of the plug to permeability damage due to encroachment of an aqueous solution having a distinct ionic makeup after application of a clay stabilization treatment. An effective clay stabilization treatment should result in a $(k_f/k_i)_{cs}$ ratio which approximates $(k_f/k_i)_t$. The third indicia is the ratio of the fluid permeability of a comparable untreated subterranean sandstone formation core measured after a fresh water flood to the fluid permeability of the core measured prior to application of any operation. The ratio $(k_f/k_i)_c$ indicates susceptibility (or sensitivity) of the plug to permeability damage due to encroachment of fluid having a distinct ionic makeup when the plug has not been previously treated in an attempt to stabilize clays. The fluid utilized to measure fluid permeability of the core before or after any operation may be crude oil or brine. Two distinct fluids can be utilized to measure the fluid permeability of one core.

To evaluate the effectiveness of a clay stabilization treatment, the $(k_f/k_i)_{cs}$ ratio must be evaluated with respect to the $(k_f/k_i)_c$ ratio. Thus, when a subterranean sandstone formation plug is relatively sensitive to permeability damage due to fresh water, i.e. a relatively low $(k_f/k_i)_c$ ratio, for example, 0.01, a moderate $(k_f/k_i)_{cs}$ ratio, for example, 0.5, would indicate an effective treatment. However, when a plug is relatively insensitive to permeability damage due to fresh water, for example, a $(k_f/k_i)_c$ ratio of 0.4, the moderate $(k_f/k_i)_{cs}$ ratio of 0.5 would indicate a relatively ineffective clay stabilization treatment. As a general guide, divergent $(k_f/k_i)_{cs}$ and $(k_f/k_i)_c$ ratios coupled with a $(k_f/k_i)_{cs}$ ratio approaching $(k_f/k_i)_t$ indicate an effective clay stabilization treatment. However, an otherwise effective treatment can actually be relatively ineffective if application of the treatment results in a high degree of formation permeability damage, i.e., a relatively low $(k_f/k_i)_t$ ratio.

Unless otherwise noted, the floods performed in the following examples are conducted at atmospheric pressure and are conducted in plugs previously flooded with brine solutions only. The presence of only brine within the plug renders the plug more susceptible to damage due to encroachment of an aqueous solution having a distinct ionic makeup. In each of the examples, comparable sandstone formation plugs are flooded to determine the $(k_f/k_i)_c$ ratio at comparable conditions, i.e., temperature, volume injected, and frontal advance rate of distilled water.

EXAMPLE 1

A linear, unfired, homogeneous Berea sandstone plug having an initial permeability of 260 md is injected with 17 pore volumes of a 15 wt.% KOH solution for 24 hours at a frontal advance rate of 0.6 m/day. The injected fluids and plug are maintained at 85° C. by a heat exchanger. The resulting $(k_f/k_i)_t$ ratio is 1.20 and the $(k_f/k_i)_{cs}$ ratio is 1.03. The $(k_f/k_i)_c$ ratio is determined on a comparable core to be less than 0.01.

EXAMPLE 2

A homogeneous sandstone plug from an Oligocene aged reservoir is injected with 26 pore volumes of 10.0 wt.% KOH solution for 24 hours at a frontal advance rate of 0.7 m/day. The injected fluids and plugs are maintained at 700 psig back pressure and at 85° C. by a heat exchanger. The results for both crude oil and brine permeability are set forth in Table 1.

TABLE 1

| Measurement Fluid | $(k_f/k_i)_I$ | $(k_f/k_i)_{cs}$ | $(k_f/k_i)_c$ |
|---|---|---|---|
| Crude | .80 | .74 | .066 |
| Brine | .81 | .75 | .064 |

The treatment aforedescribed was repeated in core plugs from the same reservoir utilizing a 15.0 wt.% KOH treatment solution. The results are set forth in Table 2.

TABLE 2

| Measurement Fluid | $(k_f/k_i)_I$ | $(k_f/k_i)_{cs}$ | $(k_f/k_i)_c$ |
|---|---|---|---|
| Crude | 1.05 | .91 | .20 |
| Brine | .95 | .90 | .20 |

This example indicates that clays present in an extremely water-sensitive subterranean sandstone formation can be effectively stabilized by contact with workover, kill, or completion fluid containing KOH without significant damage to formation permeability.

EXAMPLE 3

Comparable linear, unfired, homogeneous Berea sandstone plugs are each treated with an aqueous solution having KOH dissolved therein. The injected fluids and plugs are maintained at the temperatures hereinafter indicated by a heat exchanger. The results are set forth in Table 3.

TABLE 3

| Treatment Parameters | #1 | #2 | #3 | #4 |
|---|---|---|---|---|
| Temperature | 85° C. | 65° C. | 45° C. | 22° C. |
| Pore Volumes KOH Injected | 17 | 16 | 8.2 | 22 |
| Wt. % KOH | 15.0 | 15.0 | 30.0 | 30.0 |
| Treatment Time (Days) | 1.0 | 1.0 | 4.0 | 1.0 |
| Frontal Advance Rate m/day | 0.6 | 0.58 | 0.08 | 0.6 |
| Results | | | | |
| $(k_f/k_i)_I$ | 1.20 | 1.09 | .98 | .80 |
| $(k_f/k_i)_{cs}$ | 1.03 | .85 | .97 | .80 |
| $(k_f/k_i)_c$ | <.01 | <.01 | <.01 | <.01 |

As indicated by these results, workover, kill, or completion fluids having potassium hydroxide dissolved therein can effectively stabilize clays over a wide range of formation temperatures and should effectively stabilize clays at formation temperatures in excess of 85° C. Based on these results and kinetic theory, the treatment should be more effective at temperatures in excess of 85° C., i.e. less KOH and less treatment time are necessary to accomplish a desired result. As the clay stabilization effect of the present invention is dependent on the kinetics of hydroxide ionsandstone interaction, it is important to note that at lower formation temperatures, for example, the temperatures encountered in test Nos. 3 and 4, KOH concentration in the workover, kill, or completion solution is preferably increased to achieve effective clay stabilization comparable to that achieved at higher temperatures.

EXAMPLE 4

Three comparable, linear, unfired, homogeneous Berea sandstone plugs having initial permeabilities of approximately 380 md are injected with approximately 8 pore volumes of an aqueous solution having KOH dissolved therein for 24 hours at a frontal advance rate of approximately 0.3 m/day. The KOH concentration of the injected solution is varied for each plug. The injected fluids and plugs are maintained at 85° C. by heat exchangers. The results are set forth in Table 4.

TABLE 4

| KOH Concentration | $(k_f/k_i)_I$ | $(k_f/k_i)_{cs}$ | $(k_f/k_i)_c$ |
|---|---|---|---|
| 15.0 wt. % KOH | 1.04 | .88 | <.02 |
| 10.0 wt. % KOH | 1.02 | .58 | <.02 |
| 5.0 wt. % KOH | 1.12 | .07 | <.02 |

In addition, two comparable, linear, unfired, homogeneous Berea sandstone plugs having initial permeabilities of approximately 200 md are injected with approximately 20 pore volumes of an aqueous solution having KOH dissolved therein for 24 hours at a frontal advance rate of approximately 0.6 m/day. The injected fluids and plugs are maintained at 22° C. by heat exchangers. The results are set forth in Table 5.

TABLE 5

| KOH Concentration | $(k_f/k_i)_I$ | $(k_f/k_i)_{cs}$ | $(k_f/k_i)_c$ |
|---|---|---|---|
| 30.0 wt. % | .80 | .80 | <.01 |
| 15.0 wt. % | .87 | .02 | <.01 |

As indicated by the results in Tables 4 and 5, the concentration of potassium hydroxide in a workover, kill or completion fluid can be increased to assure treatment effectiveness, especially at lower formation temperatures, as previously discussed.

EXAMPLE 5

Two comparable, linear, unfired, homogeneous Berea sandstone plugs having initial permeabilities of approximaterly 400 md are sequentially injected with 10 pore volume of an aqueous solution having KOH dissolved therein. The injected fluids and plugs are maintained at 85° C. by heat exchangers. Ten pore volumes of 15 wt.% KOH solution are injected into one plug for 28 hours at a frontal advance rate of 0.55 m/day and into the other plug for 7 hours at a frontal advance rate of 2.0 m/day. The results are set forth in Table 6.

TABLE 6

| Treatment Time | $(k_f/k_i)_I$ | $(k_f/k_i)_{cs}$ | $(k_f/k_i)_c$ |
|---|---|---|---|
| 28 hours | 1.04 | .92 | <.01 |
| 7 hours | 1.20 | .36 | <.01 |

As illustrated by this, treatment time can be increased so as to correspondingly increase the effectiveness of the clay stabilization achieved in accordance with the present invention. As previously discussed, the preferred treatment time will vary with the temperature of the formation which the well bore penetrates.

EXAMPLE 6

A linear, unfired, homogeneous Berea sandstone plug having an initial permeability of 260 md is sequentially injected as indicated in Table 7. The injected fluids and plugs are maintained at 85° C. by a heat exchanger. The results are set forth in Table 7.

TABLE 7

| Treatment Sequence | $k_f/k_i$ |
|---|---|
| 21 pore volumes of 15.0 wt. % KOH for 24 hrs @ 0.6 m/day 3.0 wt. % NaCl permeability, 8 pore volumes of 3.0 wt. % NaCl, 10 pore volumes of distilled water, 8 pore volumes of 3.0 wt. % NaCl | 1.17 $(k_f/k_i)_t$ |
| 10 pore volumes of 3.30 wt. % NaCl | 0.89 $(k_f/k_i)_{cs}$ |
| 88 pore volumes of 0.10 wt. % NaCl over 7.0 days, @ 8 & 10 pore volume increments @ 23.5 m/day | 1.00 |
| 10 pore volumes of 3.0 wt. % NaCl | 1.07 |
| 10 pore volumes of distilled water, 10 pore volumes of 3.0 wt. % NaCl | 1.09 |
| 3.0 wt. % NaCl permeability, 10 pore volumes of distilled water, 8 pore volumes of 3.0 wt. % NaCl | 0.80 |
|  | 0.01 $(k_f/k_i)_c$ |

As illustrated by this treatment, postassium hydroxide incorporated into a workover, kill, or completion fluid in accordance with the present invention is extremely effective in stabilizing clays contacted thereby over a prolonged period of time. The permanent nature of clay stabilization achieved by the present invention eliminates costs associated with performing subsequent treatments to stabilize clays, or to correct permeability damage.

Thus it can be apprreciated that when the present invention contacts clays, it effectively stabilizes clays present in a water-sensitive, subterranean sandstone formation for a substantial period of time. The process can be applied to sandstone formations having varying mineralogies and temperatures by varying treatment, and therefore, kinetic parameters of the hydroxide ion-sandstone interaction to achieve perferred treatment effectiveness. Workover, kill, or completion fluids into which potassium hydroxide is incorporated in accordance with the present invention may contain additives conventionally incorporated therein, except for polyvalent cation salts, and significant concentrations of sodium salts, as will be evident to a skilled artisan.

While the foregoing preferred embodiment of the invention has been described and shown, it is understood that all alternatives and modifications, such as those suggested, and others may be made thereto, and fall within the scope of the invention.

We claim:

1. In a process for working over a well bore penetrating and communicating with a water-sensitive, subterranean sandstone formation wherein a fluid is injected into and maintained within the well bore while a workover operation is performed, wherein the sandstone formation contains fine particles which interact with an aqueous solution having an ionic makeup distinct from connate water to reduce permeability of the formation and fluid flow therethrough, and wherein the injected fluid invades the sandstone formation and contacts at least a portion of the fine particles, the improvement comprising:

incorporating potassium hydroxide into said injected fluid in an amount sufficient to effectively render said contacted fine particles relatively insensitive to said aqueous solution having a distinct ionic makeup for a substantial period of time, said potassium hydroxide existing in said injected fluid as potassium ions and hydroxide ions, said hydroxide ions interacting with said sandstone formation in the presence of said potassium ions to effectively render said contacted fine particles relatively insensitive to said aqueous solution having a distinct ionic makeup.

2. The process of claim 1 wherein said fine particles are clays. 025

3. The process of claim 2 wherein said clays comprise swelling clays and migratable clays.

4. The process of claim 3 wherein said swelling clays are selected from the group consisting of montmorillonite clays, swelling chlorite, vermiculite, mixed layered swelling clays, and mixtures thereof.

5. The process of claim 3 wherein said migratable clays are selected from the group consisting of poorly cemented kaolinite clays, poorly cemented illite clays and mixtures thereof.

6. The process of claim 1 wherein said fluid having potassium hydroxide incorporated therein is injected into said well bore at a finite flow rate so as to purposely invade the sandstone formation.

7. The process of claim 1 wherein said potassium hydroxide is incorporated in said fluid in a concentration of from about 1 wt.% to about 25 wt.%.

8. The process of claim 7 wherein said concentration of potassium hydroxide in said fluid is inversely related to the temperature of said sandstone formation.

9. The process of claim 1 wherein fluid having potassium hydroxide incorporated therein is maintained in said well bore for a period of time from about 1 hour to about 48 hours.

10. The process of claim 9 wherein said period of time is inversely related to the temperature of said sandstone formation.

11. The process of claim 1 wherein said sandstone formation is a hydrocarbon-bearing sandstone formation.

12. The process of claim 1 wherein said sandstone formation has a temperature of from about 22° C. to about 85° C. and above.

13. The process of claim 1 wherein said aqueous solution having a distinct ionic makeup is fresh water.

14. In a process for killing a well bore penetrating and communicating with a water-sensitive, subterranean sandstone formation wherein an aqueous fluid is injected into and maintained within the well bore having a density sufficient to create a hydrostatic pressure greater than the formation pressure so as to prevent encroachment of fluids from the formation into the well bore, wherein the sandstone formation contains fine particles which interact with an aqueous solution having an ionic makeup distinct from connate water to reduce permeability of the formation and fluid flow therethrough, and wherein the injected fluid invades the sandstone formation and contacts at least a portion of the fine particles, the improvement comprising:

incorporating potassium hydroxide into said injected fluid in an amount sufficient to effectively render said contacted fine particles relatively insensitive to said aqueous solution having a distinct ionic makeup for a substantial period of time, said potassium hydroxide existing in said injected fluid as potassium ions and hydroxide ions, said hydroxide ions interacting with said sandstone formation in the presence of said potassium ions to effectively render said contacted fine particles relatively insensitive to said aqueous solution having a distinct ionic makeup.

15. The process of claim 14 wherein said fine particles are clays.

16. The process of claim 15 wherein said clays comprise swelling clays and migratable clays.

17. The process of claim 16 wherein said swelling clays are selected from the group consisting of montmorillonite clays, swelling chlorite, vermiculite, mixed layered swelling clays, and mixtures thereof.

18. The process of claim 16 wherein said migratable clays are selected from the group consisting of poorly cemented kaolinite clays, poorly cemented illite clays and mixtures thereof.

19. The process of claim 14 wherein said fluid having potassium hydroxide incorporated therein is injected into said well bore at a finite flow rate so as to purposely invade the sandstone formation.

20. The process of claim 14 wherein said potassium hydroxide is incorporated in said fluid in a concentration of from about 1 wt.% to about 25 wt.%.

21. The process of claim 20 wherein said concentration of potassium hydroxide in said fluid is inversely related to the temperature of said sandstone formation.

22. The process of claim 14 wherein fluid having potassium hydroxide incorporated therein is maintained in said well bore for a period of time from about 1 hour to about 48 hours.

23. The process of claim 22 wherein said period of time is inversely related to the temperature of said sandstone formation.

24. The process of claim 14 wherein said sandstone formation is a hydrocarbon-bearing sandstone formation.

25. The process of claim 14 wherein said sandstone formation has a temperature of from about 22° C. to about 85° C. and above.

26. The process of claim 14 wherein said aqueous solution having a distinct ionic makeup is fresh water.

27. In a process for completing a well bore penetrating and communicating with a water-sensitive, subterranean sandstone formation wherein a fluid is injected into the well bore in preparation for subsequent injection or production of fluids, wherein the sandstone formation contains fine particles which interact with an aqueous solution having an ionic makeup distinct from connate water to reduce permeability of the formation and fluid flow therethrough, and wherein the injected fluid invades the sandstone formation and contacts at least a portion of the fine particles, the improvement comprising:

incorporating potassium hydroxide into said injected fluid in an amount sufficient to effectively render said contacted fine particles relatively insensitive to said aqueous solution having a distinct ionic makeup for a substantial period of time, said potassium hydroxide existing in said injected fluid as potassium ions and hydroxide ions, said hydroxide ions interacting with said sandstone formation in the presence of said potassium ions to effectively render said contacted fine particles relatively insensitive to said aqueous solution having a distinct ionic makeup.

28. The process of claim 27 wherein said fine particles are clays.

29. The process of claim 28 where said clays comprise swelling clays and migratable clays.

30. The process of claim 29 wherein said swelling clays are selected from the group consisting of montmorillonite clays, swelling chlorite, vermiculite, mixed layered swelling clays, and mixtures thereof.

31. The process of claim 29 wherein said migratable clays are selected from the group consisting of poorly cemented kaolinite clays, poorly cemented illite clays and mixtures thereof.

32. The process of claim 27 wherein said fluid having potassium hydroxide incorporated therein is injected into said well bore at a finite flow rate so as to purposely invade the sandstone formation.

33. The process of claim 27 wherein said potassium hydroxide is incorporated in said fluid in a concentration of from about 1 wt.% to about 25 wt.%.

34. The process of claim 33 wherein said concentration of potassium hydroxide in said fluid is inversely related to the temperature of said sandstone formation.

35. The process of claim 27 wherein said fluid having potassium hydroxide incorporated therein is maintained in said well bore for a period of time from about 1 hour to about 48 hours.

36. The process of claim 35 wherein said period of time is inversely related to the temperature of said sandstone formation.

37. The process of claim 27 wherein said sandstone formation is a hydrocarbon-bearing sandstone formation.

38. The process of claim 27 wherein said sandstone formation has a temperature of from about 22° C. to about 85° C. and above.

39. The process of claim 27 wherein said fluid is injected into the well bore to clean the face of the well bore prior to a cementing operation.

40. The process of claim 27 wherein said aqueous solution having a distinct ionic makeup is fresh water.

* * * * *